(12) United States Patent
Fredericks

(10) Patent No.: US 9,241,473 B2
(45) Date of Patent: Jan. 26, 2016

(54) PET ACCESS LIMITING DEVICE

(76) Inventor: Pinky Fredericks, New Brighton, PA (US)

( * ) Notice: Subject to any disclaimer, the term of this patent is extended or adjusted under 35 U.S.C. 154(b) by 1193 days.

(21) Appl. No.: 12/401,286

(22) Filed: Mar. 10, 2009

(65) Prior Publication Data

US 2009/0229534 A1    Sep. 17, 2009

Related U.S. Application Data

(60) Provisional application No. 61/035,482, filed on Mar. 11, 2008.

(51) Int. Cl.
| | |
|---|---|
| *A01K 1/02* | (2006.01) |
| *A01K 1/00* | (2006.01) |
| *A01K 1/03* | (2006.01) |
| *A01K 5/01* | (2006.01) |

(52) U.S. Cl.
CPC .............. *A01K 1/0023* (2013.01); *A01K 1/033* (2013.01); *A01K 5/0142* (2013.01)

(58) Field of Classification Search
CPC ............................ A01K 1/0023; A01K 1/033
USPC .......... 119/484, 473, 481, 482, 501, 507, 472
See application file for complete search history.

(56) References Cited

U.S. PATENT DOCUMENTS

| | | | |
|---|---|---|---|
| 582,410 A | 5/1897 | Young | |
| 920,381 A | 5/1909 | O'Connell | |
| 955,503 A | 4/1910 | Donaldson | |
| 1,525,561 A | 2/1925 | Baird | |
| 1,902,136 A * | 3/1933 | Mills | 446/124 |
| 2,138,544 A | 11/1938 | Gulla | |
| 4,029,051 A | 6/1977 | McKinney | |
| 4,760,816 A * | 8/1988 | Rhodes | 119/165 |
| 4,803,952 A * | 2/1989 | Houser | 119/499 |
| 5,133,291 A | 7/1992 | Justice | |
| 5,575,239 A * | 11/1996 | Bradburn et al. | 119/500 |
| 5,678,509 A * | 10/1997 | Dillon | 119/496 |
| 5,769,028 A * | 6/1998 | Deckys | 119/496 |
| 5,782,206 A * | 7/1998 | Markowitz | 119/622 |
| 5,852,987 A | 12/1998 | Lamp, Jr. | |
| 2007/0000449 A1 * | 1/2007 | Martin | 119/484 |
| 2007/0107667 A1 * | 5/2007 | Morris | 119/482 |
| 2009/0107412 A1 * | 4/2009 | Chen | 119/482 |

\* cited by examiner

*Primary Examiner* — Kristen C Hayes
(74) *Attorney, Agent, or Firm* — The Webb Law Firm

(57) ABSTRACT

A device for limiting access of an animal is disclosed. The device includes a housing having a sidewall defining an opening therein, and a housing interior in communication with the opening. The device also includes an opening-size selectable member engageable with at least a portion of the housing for restricting at least one dimension of the opening to form a modified opening. The modified opening allows passage of a first animal into the housing interior through the opening, and restrains a second animal from entering the housing interior. In one configuration, the second animal is larger than the first animal.

7 Claims, 20 Drawing Sheets

PET ACCESS LIMITING DEVICE

CROSS REFERENCE TO RELATED APPLICATION

This application claims priority to U.S. Provisional Patent Application No. 61/035,482, filed Mar. 11, 2008, entitled "Pet Access Limiting Device", the entire disclosure of which is herein incorporated by reference.

BACKGROUND OF THE INVENTION

1. Field of the Invention

The present invention relates generally to pet access limiting devices and, more particularly, to an apparatus having an adjustable opening for allowing animals of a certain size to pass therethrough, while preventing larger animals from entering the opening.

2. Description of Related Art

Many pet owners have more than one animal living within a house. In these circumstances, pet owners often encounter difficulties in keeping food dishes and/or litter boxes separated between various pets. For example, if a large cat and a small cat reside within the same dwelling, the large cat will often consume all of its food, and will then begin to consume the food left for the small cat. This can result in excessive food consumption for the large cat, and poor nutrition for the small cat. A similar situation can arise when a large dog and a small dog reside within the same dwelling, or when a cat and a dog share the same house. This often requires that the animal owner elevate the cat food to an inconvenient location in order to prevent the dog from eating the food. Typically, pet owners will resort to placing food dishes on clothes dryers, computer tables, bedroom dressers, dining room tables, or kitchen counters. This often results in pet hair, pet food, and general pet messes in such areas, which can be both unsightly and unsanitary. Alternatively, a pet owner may be required to be present at each, or most, feedings to ensure that each animal receives the proper amount of food and/or water.

Similarly, litter box issues can also arise when multiple animals reside within the same space. In certain situations, a dog will consume feces left in a litter box by a cat. If a litter box is left unguarded by the animal owner, the dog may consume the feces and subsequently become ill. The dog may also consume feces and subsequently approach children or adults, potentially putting them at risk for transmission of disease.

At other times, nursing or ill animals must be carefully watched by their owner and often separated from other animals within the house. Nursing or ill animals often have special dietary restrictions, such as special foods, food amounts, or medicines, which must be consumed by the ill animal only and not shared among other pets. This often requires that the pet owner confine the nursing or ill animal to a room or gated area within the house that is separated from other pets. Separating animals in such a fashion necessitates the use of gates or requires that certain areas of the home remain restricted from otherwise normal use.

In each of the above situations, an extra burden is placed on the pet owner to diligently watch their pets and the behaviors of one pet toward another. This extra burden can result in increased time required at feedings, constant guarding of a litter box, and/or added expense in extra food, gates, or other equipment to physically separate the space occupied by one pet in comparison to other pets. Accordingly, a need exists for an improved apparatus for separating one pet from another at feeding times and during use of a litter box.

SUMMARY OF THE INVENTION

The present invention has been developed in view of the foregoing problems and other deficiencies of traditional feeding and litter box structures. The apparatus of the present invention includes a housing having a preformed opening therein. The apparatus also includes an opening-size selectable member for defining a specific opening size between an interior of the housing and the surrounding environment. The opening-size selectable member is engageable with a portion of the housing adjacent the opening, such that at least a portion of the opening-size selectable member may be disposed over the opening. The opening-size selectable member may be adjusted by the user to define a specific opening size through which an animal may pass, while restraining any larger animals from passing through the opening. The opening-size selectable member may be adjusted by the user and engaged with a portion of the housing, thereby locking the opening-size selectable member in a fixed location.

In one embodiment of the present invention, the device includes a housing having a sidewall defining an opening therein, and a housing interior in communication with the opening. The device also includes an opening-size selectable member engageable with at least a portion of the housing for restricting at least one dimension of the opening to form a modified opening. The modified opening allows passage of a first animal into the housing interior through the opening, and restrains a second animal from entering the housing interior. The second animal may be larger than the first animal.

Optionally, the housing interior may be adapted to house at least one of a food dish and a litter box therein. The opening-size selectable member may be engageable with at least a portion of the housing adjacent the opening. At least a portion of the opening-size selectable member may be disposed over the opening. In a further configuration, the opening-size selectable member may be adjusted to define a plurality of modified openings.

The opening-size selectable member may be fixed with respect to a portion of the housing to define a fixed modified opening. In one configuration, the opening-size selectable member may include a plurality of ridges for correspondingly engaging a plurality of steps associated with a portion of the housing. In another configuration, the opening-size selectable member may include a slideable panel portion slideably engaged with a portion of the housing. In another configuration, the opening-size selectable member may include a plurality of moveable bars restrainably connected to a portion of the housing. In yet another configuration, the opening-size selectable member may include at least one crescent shaped body moveably received at least partially within a track disposed within the housing. In yet another configuration, the opening-size selectable member may include an attachable panel portion engageable with a portion of the housing. The panel portion may include one of a peg and a hole, and the housing may include the other of the peg and the hole, such that the hole is adapted to receive the peg therethrough to secure the opening-size selectable member and the housing. Optionally, the device may include a second attachable panel portion engageable with a portion of the housing. The attachable panel portion may be engageable with a portion of the housing for restraining the opening in a first dimension, and the second attachable panel portion may be engageable with a portion of the housing for restraining the opening in a second dimension, with the second dimension being different than the first dimension.

The housing may also include a top portion defining an access port therethrough, with the access port in communication with the housing interior. In certain configurations, the modified opening restrains at least a portion of the second animal from entering the housing interior.

In accordance with another embodiment of the present invention, a device for limiting access of an animal includes a housing having a sidewall defining an opening therein, and a housing interior in communication with the opening. The device also includes means for restricting at least one dimension of the opening to allow passage of a first-sized animal into the housing interior through the opening while restraining a second-sized animal from entering the housing interior. The second-sized animal may be larger than the first-sized animal. In one configuration, the means for restricting may define a plurality of modified openings.

In accordance with another embodiment of the present invention, a device for limiting access of an animal includes a housing having a sidewall defining an opening therein, and a housing interior in communication with the opening. The device also includes an opening-size selectable member engageable with at least a portion of the housing for restricting at least one dimension of the opening to form a modified opening. The opening-size selectable member may include a plurality of ridges for correspondingly engaging a plurality of steps associated with a portion of the housing. The means for restricting may define a plurality of modified openings.

DETAILED DESCRIPTION OF THE PREFERRED EMBODIMENTS

Figure 1:
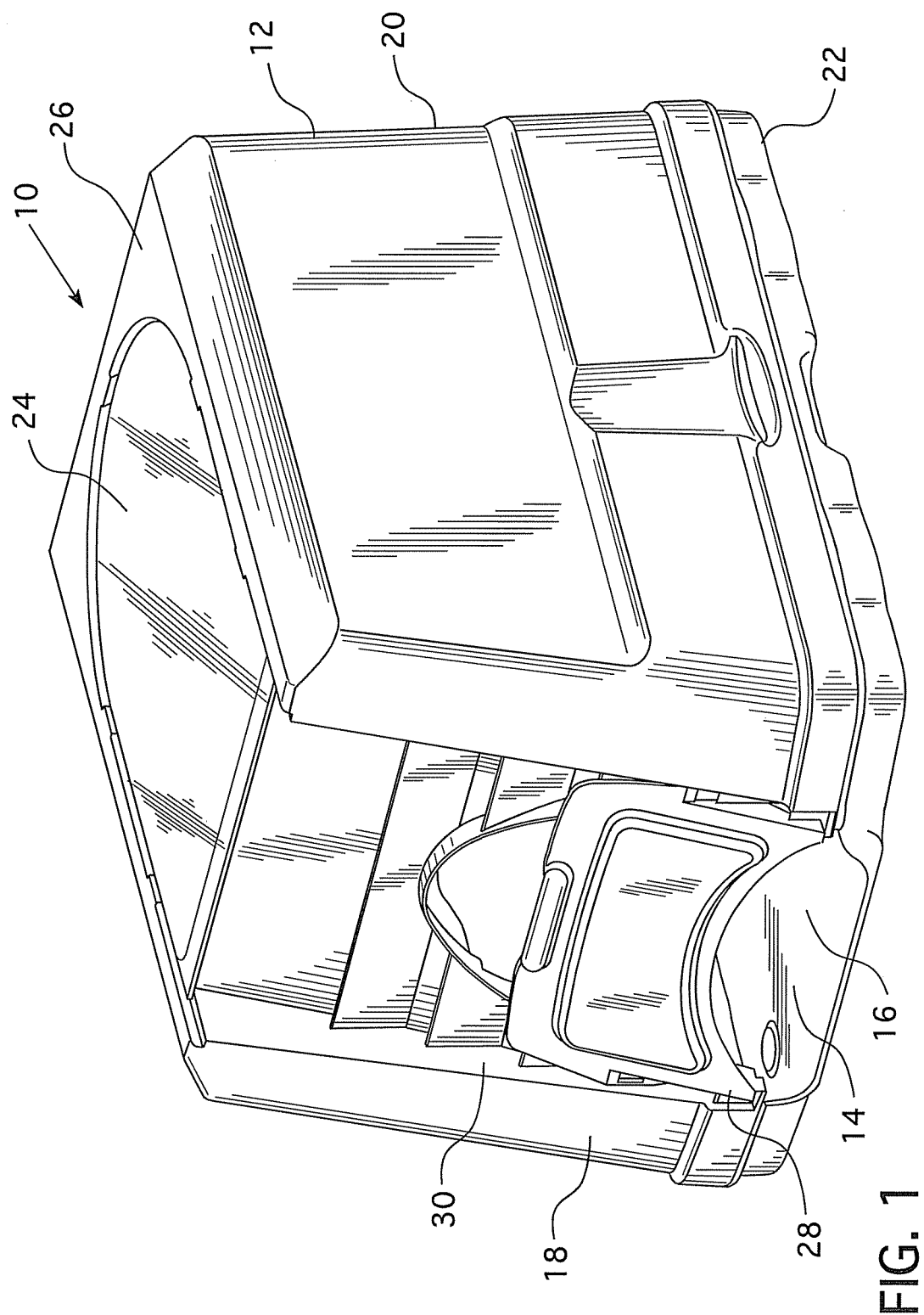
FIG. 1 is a perspective side view of a pet access limiting device having an adjustable opening-size selectable member in accordance with an embodiment of the present invention.
Figure 2:
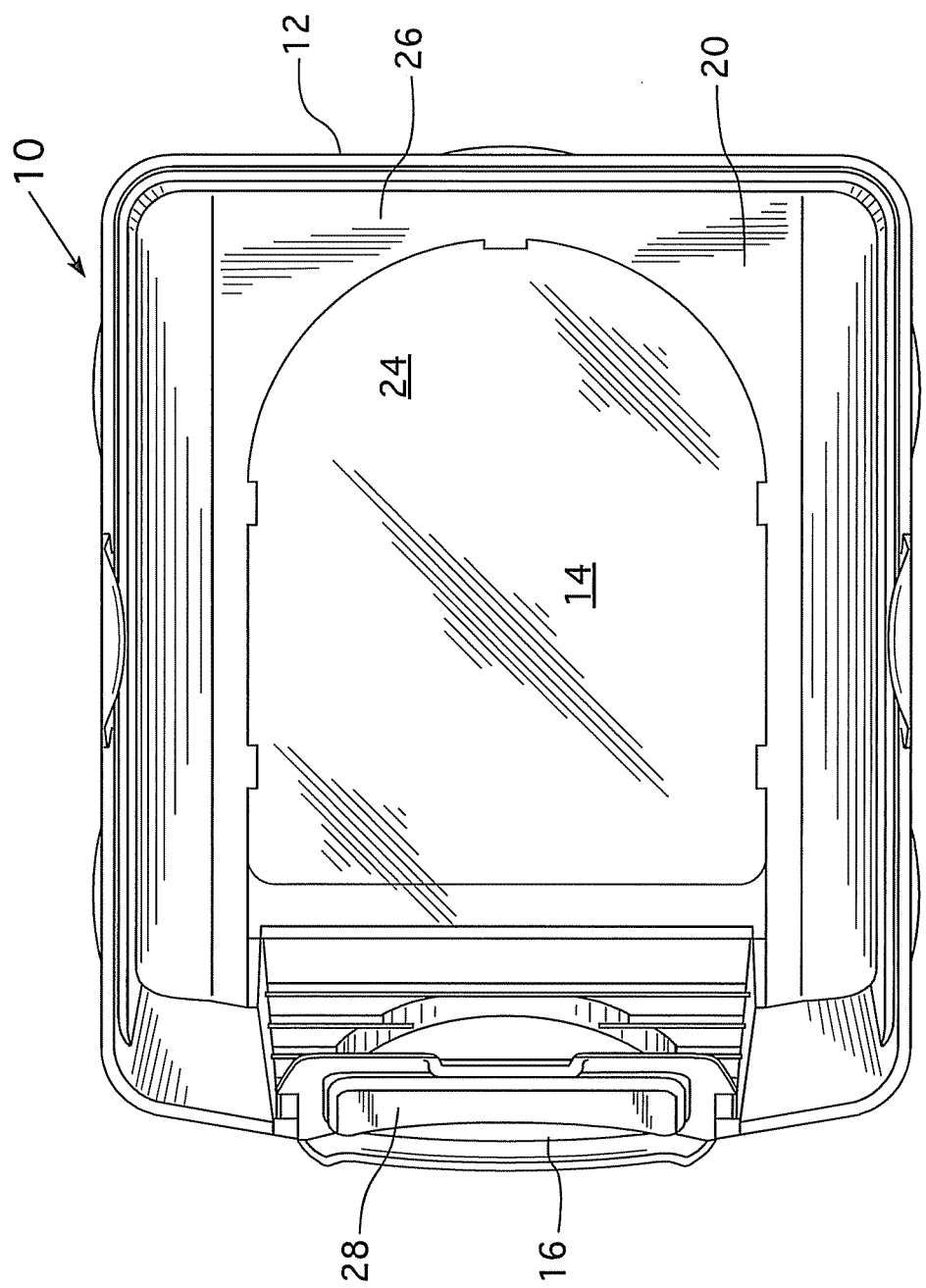
FIG. 2 is a top view of the pet access limiting device of FIG. 1.
Figure 3:
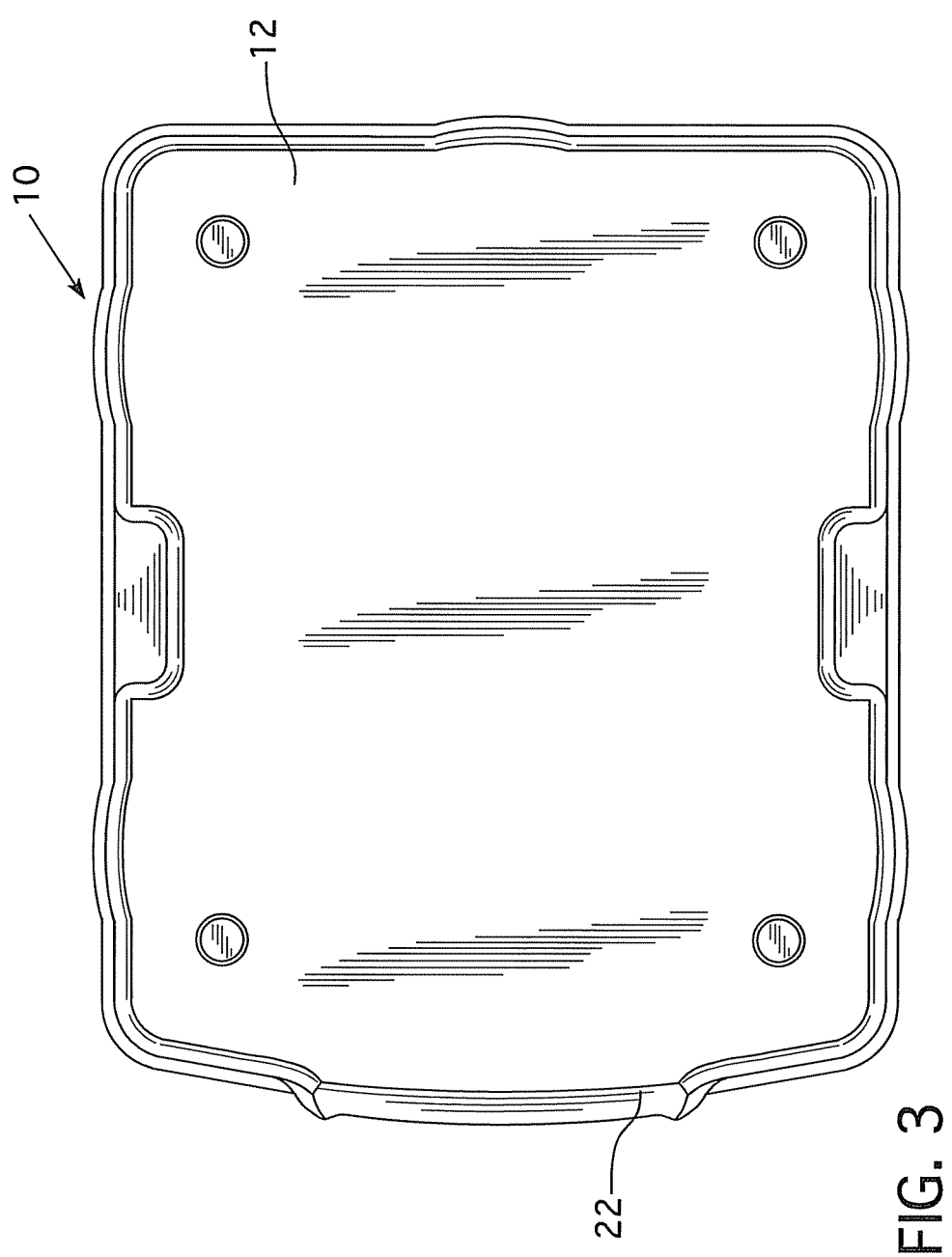
FIG. 3 is a bottom view of the pet access limiting device of FIG. 1
Figure 4:
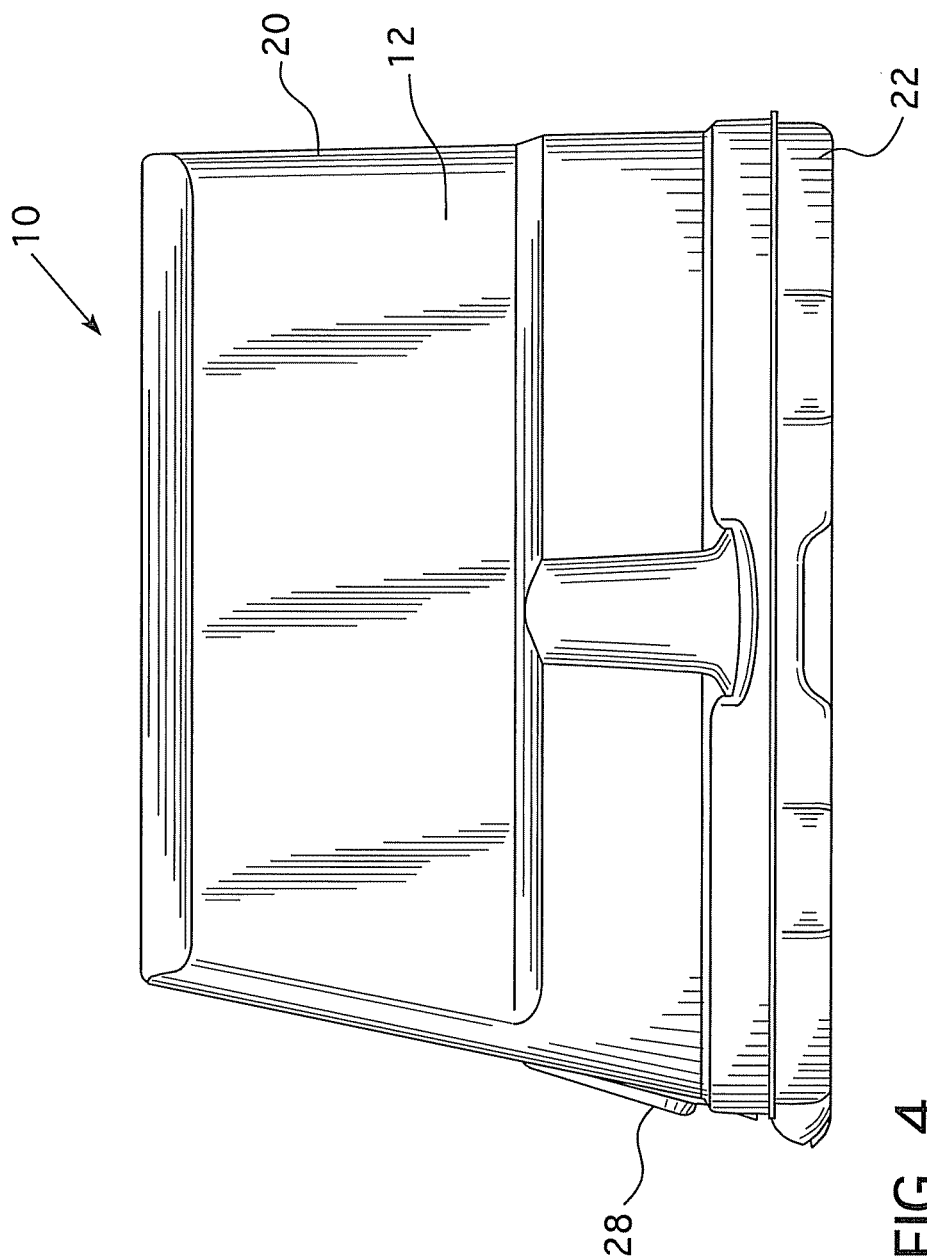
FIG. 4 is a side view of the pet access limiting device of FIG. 1

As shown in FIGS. 1-10, in one embodiment the pet access limiting device 10 includes a housing 12 having an interior 14 into which a feeding dish or litter pan may be positioned. The housing 12 defines an opening 16 extending through a portion of a sidewall 18. The housing 12 can have any suitable dimensions and shape such that a feeding dish or litter pan may be positioned within the housing 12. Additionally, the housing 12 may be made of any suitable materials, such as a polymeric composition. In certain configurations, the housing 12 may include a top portion 20 engageable with a bottom portion 22, such as through snap-fit means or other locking arrangement. In another configuration, the housing 12 may include only the top portion 20, in which the bottom surface is left open to rest directly on the floor. In yet another embodiment, the top portion 20 may include an access port 24 in a top surface 26 to allow a user to pass items, such as a feeding dish and/or litter box, therethrough. It has been found that by providing the access port 24 within the top surface 26 of the housing 12, animals do not attempt to gain access to the interior 14 of the housing 12. Accordingly, a user may advantageously use the access port 24 to pass items therethrough without concern that an animal will enter the housing 12.

The housing 12 also includes an opening-size selectable member 28 which is moveably engageable with at least a portion of the housing 12. In one embodiment, the opening-size selectable member 28 is engageable with at least a portion of an exterior surface 30 of the housing 12. In another embodiment, the opening-size selectable member 28 may be engaged with a first portion of the housing 12 by the user, and subsequently moved and engaged with a second portion of the housing 12, also by the user. The opening-size selectable member 28 may be engageable with a portion of the housing 12 adjacent the opening 16, such that the opening-size selectable member 28 may be disposed at least partially over the opening 16 to restrict the size of the opening 16. In one embodiment, the opening-size selectable member 28 may be engaged with a portion of the housing 12 to create a desired opening size that is smaller than the opening 16 of the housing 12. In another embodiment, the desired opening size corresponds to the specific size for allowing an animal of one size to pass therethrough, while preventing larger animals from accessing the interior 14 of the housing 12. As used herein, the term "animal" shall include animals kept as pets, as well as human infants and toddlers.

Figure 5:
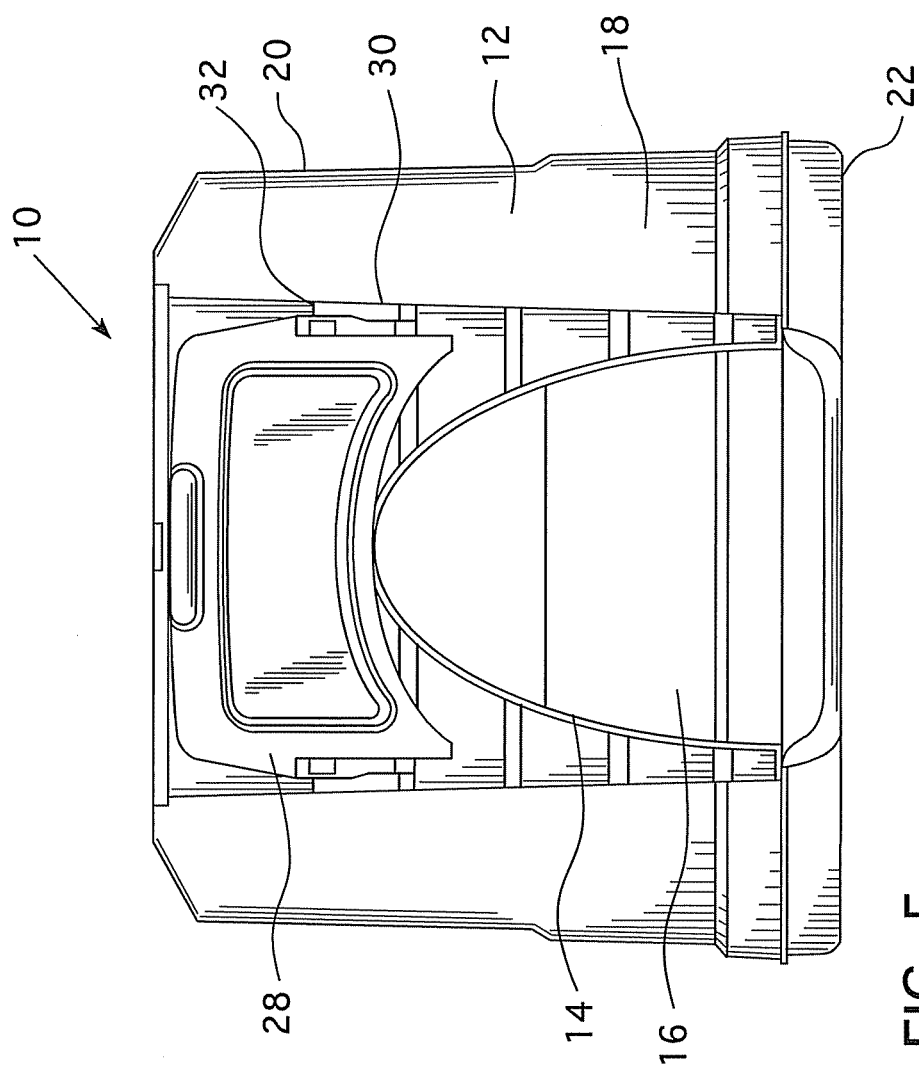
FIG. 5 is a front view of the pet access limiting device of FIG. 1 having the opening-size selectable member in a first mostly-open position.
Figure 6:
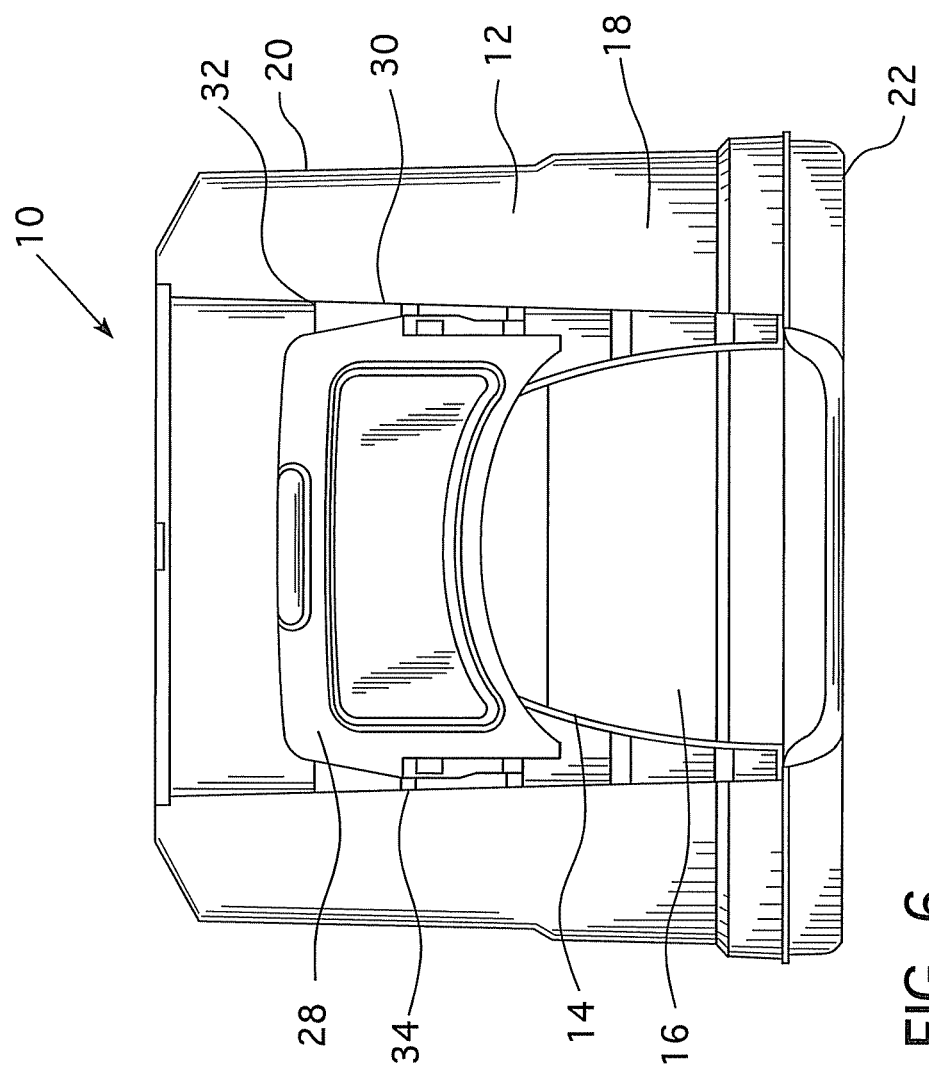
FIG. 6 is a front view of the pet access limiting device of FIG. 1 having the opening-size selectable member in a second partly-open position.
Figure 7:
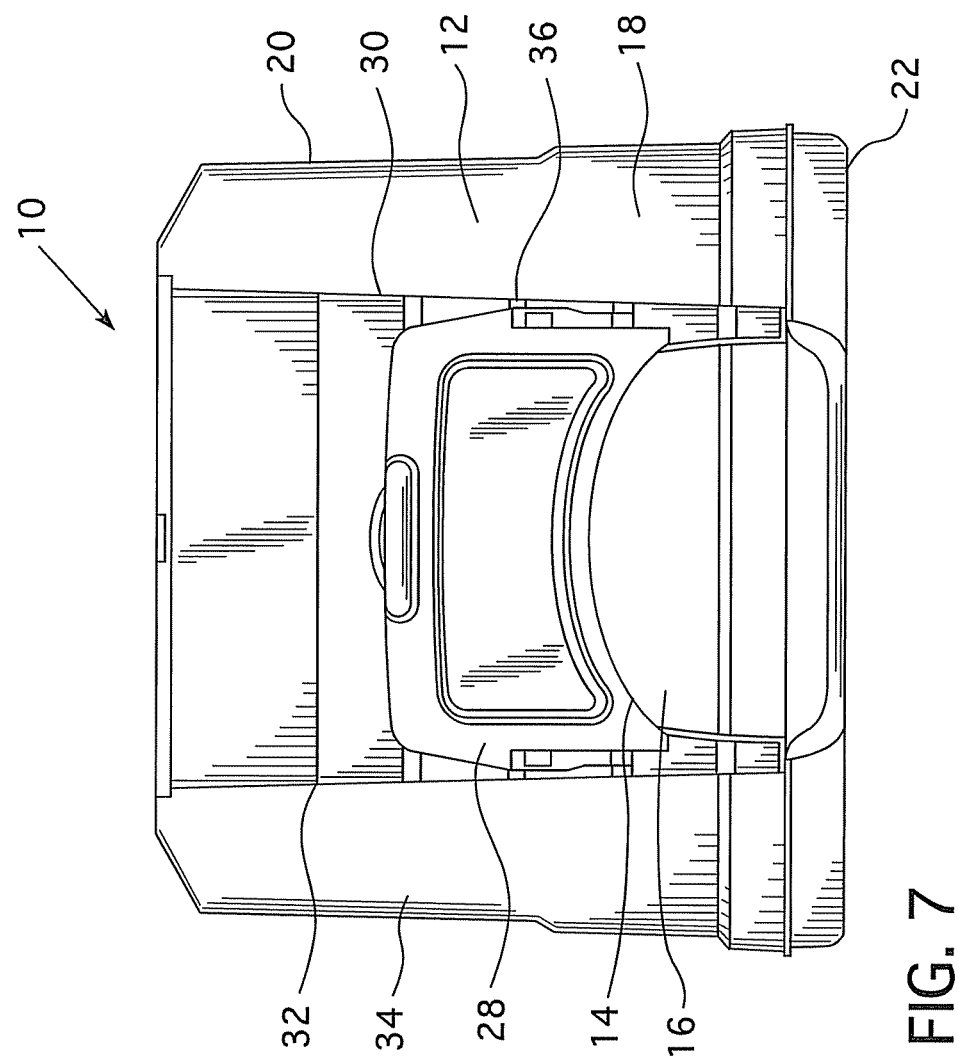
FIG. 7 is a front view of the pet access limiting device of FIG. 1 having the opening-size selectable member in a third partly-closed position.
Figure 8:
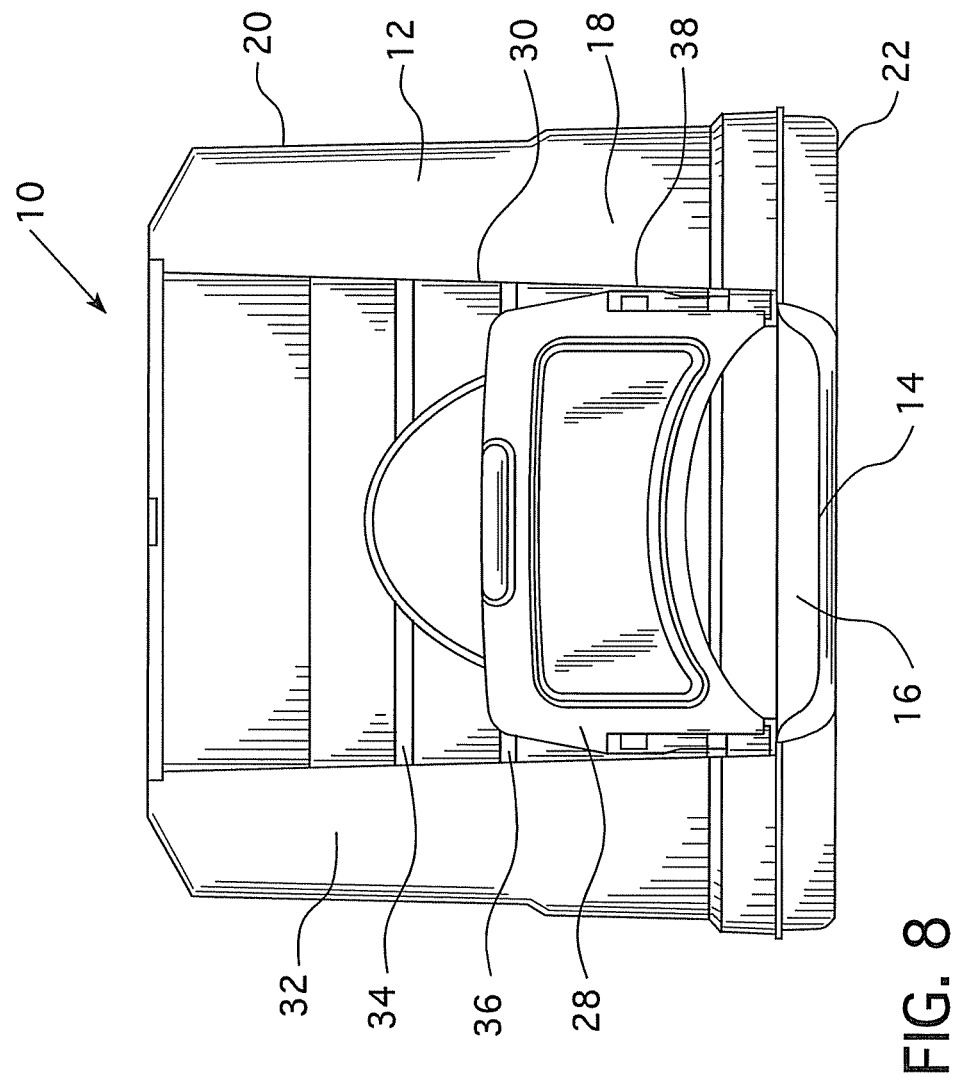
FIG. 8 is a front view of the pet access limiting device of FIG. 1 having the opening-size selectable member in a fourth mostly-closed position.

The progression of decreasing the desired opening size by engaging the opening-size selectable member 28 with different portions of the housing 12 is shown in FIGS. 5-8. As shown in FIG. 5, in an initial position, the opening-size selectable member 28 may be engaged with a first portion 32 of the housing 12 which does not limit the size of the opening 16. This position can be largely considered a storage position for the opening-size selectable member 28, as the opening-size selectable member 28 does not restrict the desired opening size of the opening 16. As shown in FIG. 6, the opening-size selectable member 28 may be engaged with a second portion 34 of the housing 12, which slightly limits the opening size of the opening 16. In this position, slightly larger animals may be prevented from accessing the interior 14 of the housing 12. As shown in FIG. 7, the opening-size selectable member 28 may be engaged with a third portion 36 of the housing 12, which further limits the opening size of the opening 16. In this position, animals which could pass through the opening size defined when the opening-size selectable member 28 is engaged with the second position 34 of the housing 12, could not pass through the opening size defined when the opening-size selectable member 28 is engaged with the third position 36 of the housing 12. As shown in FIG. 8, the opening-size selectable member 28 may be engaged with a fourth portion 38 of the housing 12, which further limits the opening size of the opening 16 to a mostly closed position. Only very small animals may access the interior 14 of the housing 12 when the opening-size selectable member 28 is engaged with the fourth portion 38 of the housing 12. In this position, animals which could pass through the opening size defined when the opening-size selectable member 28 is engaged with the third position 36 of the housing 12, could not pass through the opening size defined when the opening-size selectable member 28 is engaged with the fourth position 38 of the housing 12. Transition between any of the first position 32, second position 34, third position 36 and fourth position 38 may be easily accomplished by the user. Although the embodiment described herein references four general positions in which the opening-size selectable member 28 may be engaged with the housing 12, it is contemplated herein that additional or fewer engagement positions may also be employed within the scope of the present invention.

Figure 9:
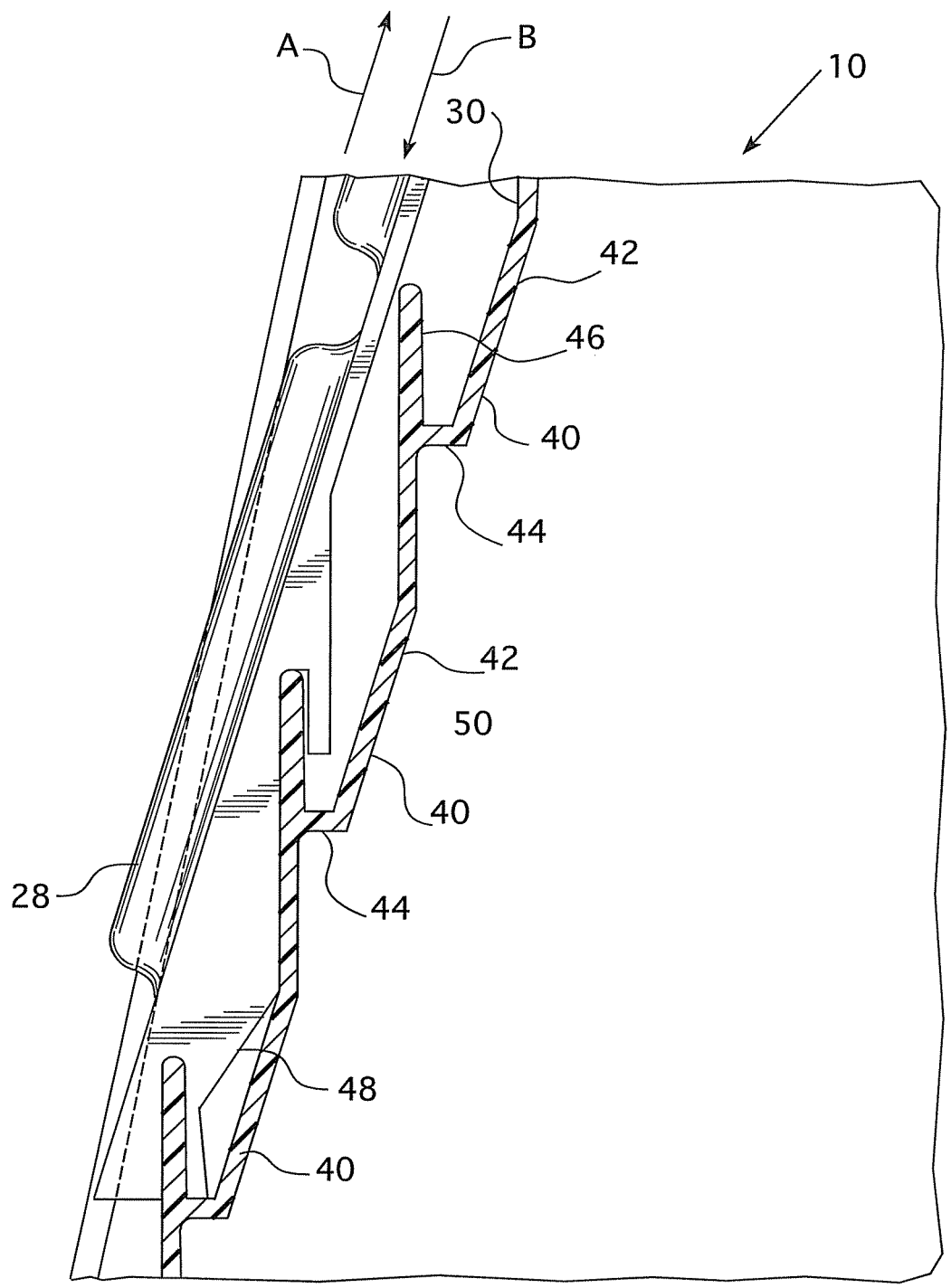
FIG. 9 is a partial cross-sectional side view of an engagement mechanism in accordance with an embodiment of the present invention.
Figure 10:
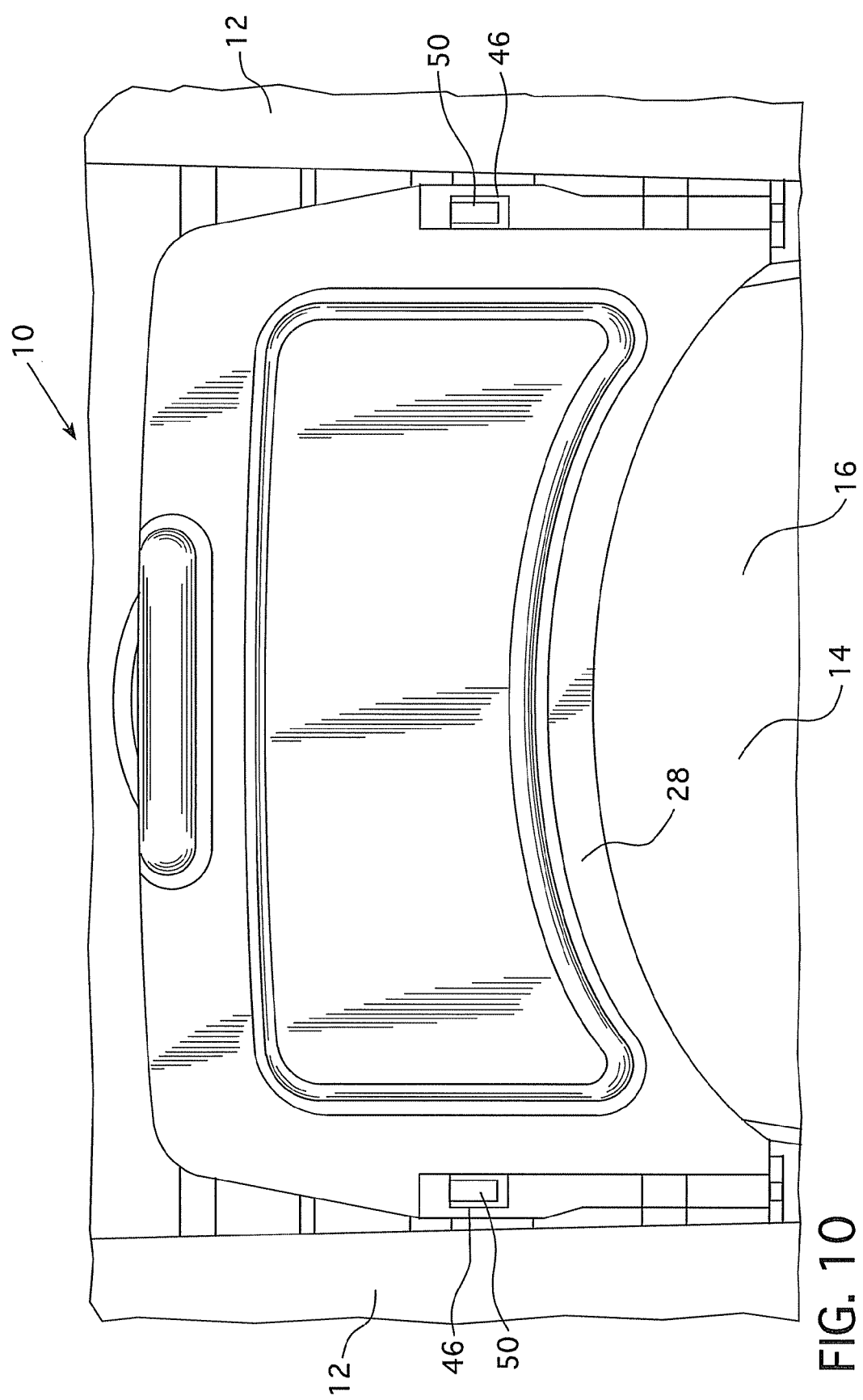
FIG. 10 is a partial cross-sectional front view of the opening-size selectable member and engagement mechanism of FIG. 9 in accordance with an embodiment of the present invention.

In one embodiment, as shown in FIGS. 9-10, the opening-size selectable member 28 may be engaged with a step 40 of the housing 12. In this embodiment, the exterior surface 30 of the housing 12 includes a plurality of cascading steps 40. Each step 40 may include a riser portion 42, a base portion 44, and a lip portion 46. As shown in FIG. 9, the base portion 44 be connected to the riser portion 42 and may extend from the housing 12 in a substantially perpendicular orientation from the riser portion 42. The lip portion 46 may be connected to the base portion 44 and may extend in a substantially upwardly orientation from the base portion 44. In one embodiment, the riser portion 42 and the lip portion 46 may extend in substantially the same orientation. In another embodiment, the lip portion 46 may be angled with respect to the base portion 44. In yet another embodiment, the lip portion 46 and the riser portion 42 may form a V-shape cross-section. The opening-size selectable member 28 may have an exterior surface 48 having a protrusion 50 for engaging the lip portion 46 of the housing 12. The protrusion 50 and the lip portion 46 are structured such that when engaged, the protrusion 50 extends into the space defined by the lip portion 46, the base portion 44, and the riser portion 42. In another embodiment, the protrusion 50 is angled to correspond to the angle of the lip portion 46 of the housing 12, such that the protrusion 50 rests along the lip portion 46. Accordingly, the opening-size selectable member 28 may be engaged with the housing 12 by applying a generally downward force to the opening-size selectable member 28 along the arrow B, shown in FIG. 9, which engages the angled protrusion 50 of the opening-size selectable member 28 with the angled lip portion 46 of the housing 12. When a user desires to engage the opening-size selectable member 28 with another portion of the housing 12, the user applies a generally upward force to the opening-size selectable member 28 along the arrow A, shown in FIG. 9. This upwardly directed force disengages the opening-size selectable member 28 from the housing 12 and allows the user to re-position the opening-size selectable member 28 as described above.

Figure 11:
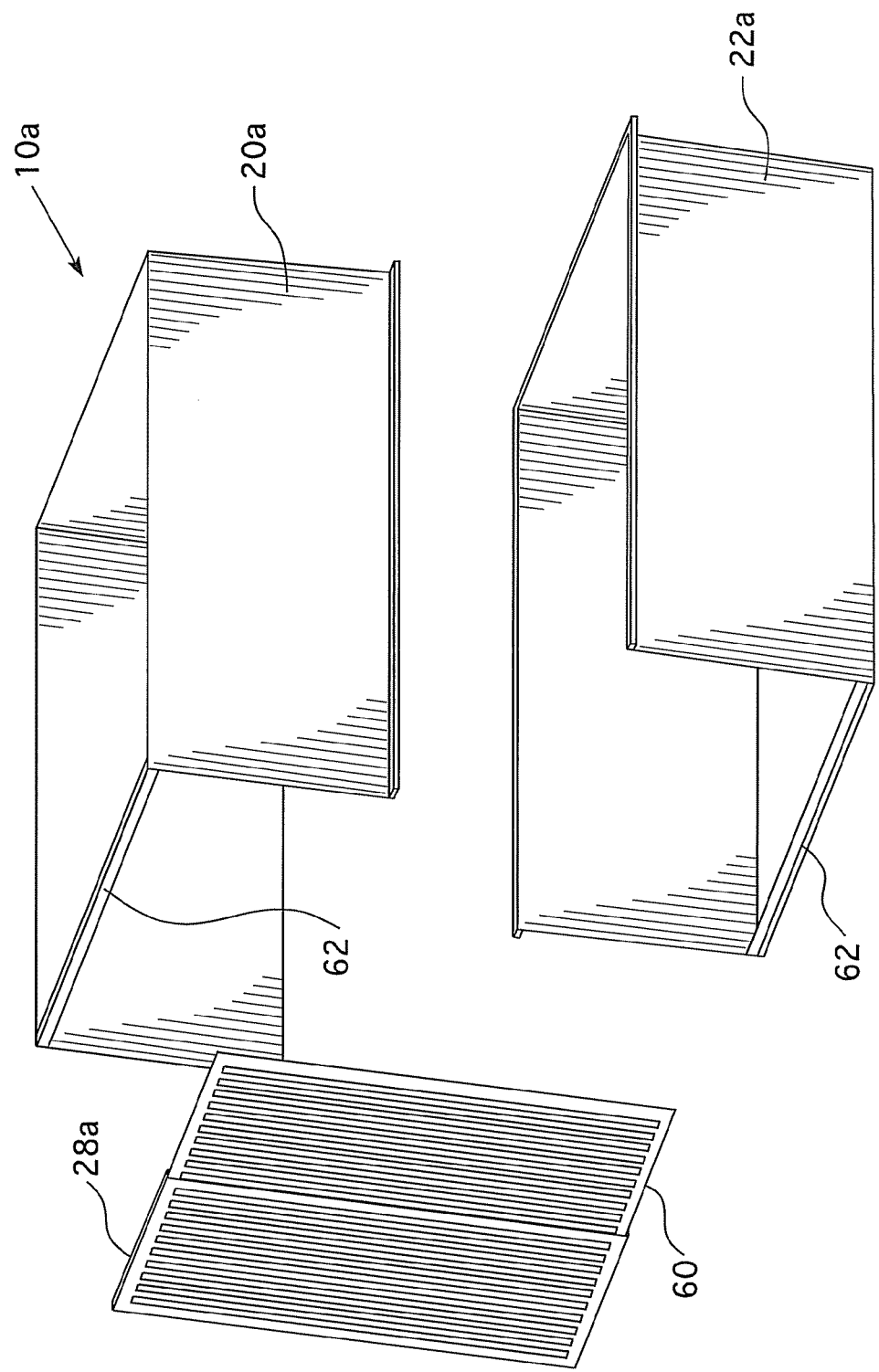
FIG. 11 is an exploded perspective view of an alternative pet access limiting device in accordance with an embodiment of the present invention.
Figure 12:
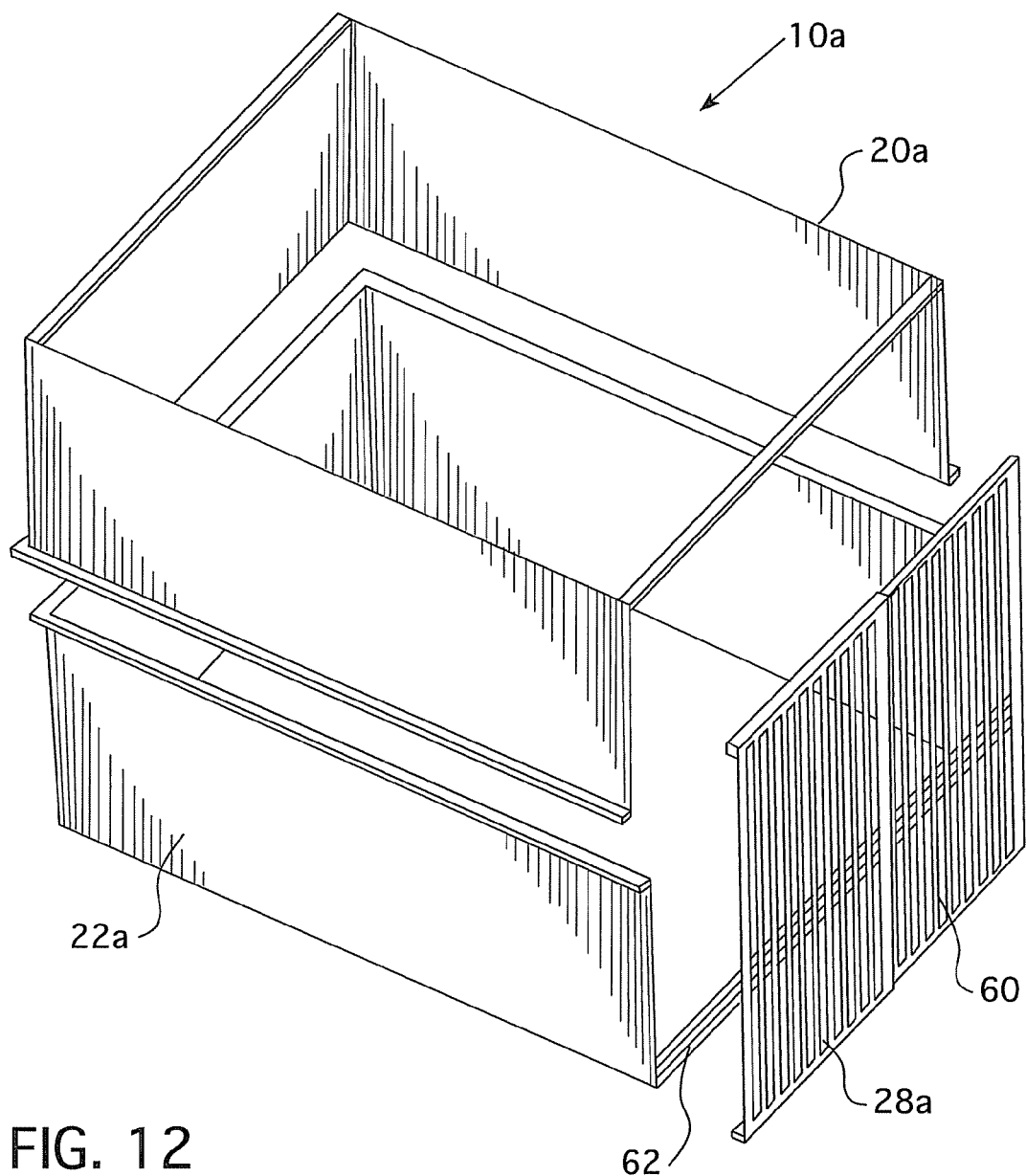
FIG. 12 is an alternative exploded perspective view of the pet access limiting device of FIG. 11.
Figure 13:
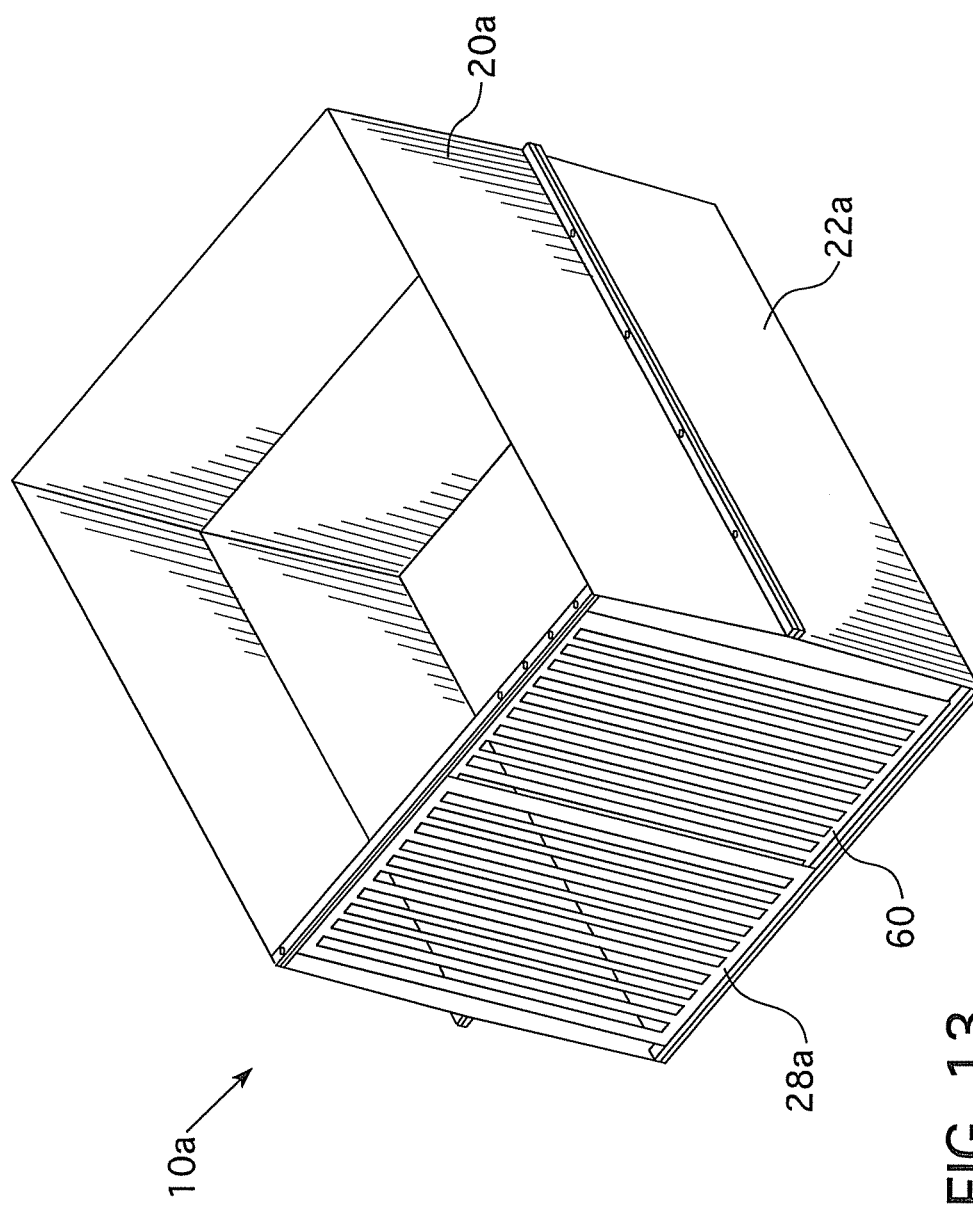
FIG. 13 is an assembled perspective view of the pet access limiting device of FIG. 11.

In another embodiment, shown in FIGS. 11-13, the pet access limiting device 10a may include a top portion 20a engageable with a bottom portion 22a, as previously described. In this configuration, the opening-size selectable member 28a may include a slideable door portion 60. In this embodiment, at least one of the top portion 20a and the bottom portion 22a may include a track 62 adapted to allow the door portion 60 to slide therein. The door portion 60 may be slideable from a first position to a second position, in the fashion of a traditional sliding door. This allows a user to set the opening of the housing 12 at a predetermined location which corresponds to the size allowing a pet of a first size to pass therethrough, while restraining larger animals from entering. The door portion 60 may optionally include a locking mechanism for restraining the door portion 60 at any location within the track 62. Example locking mechanisms include resistance springs, physical peg barriers, and the like.

Figure 14:
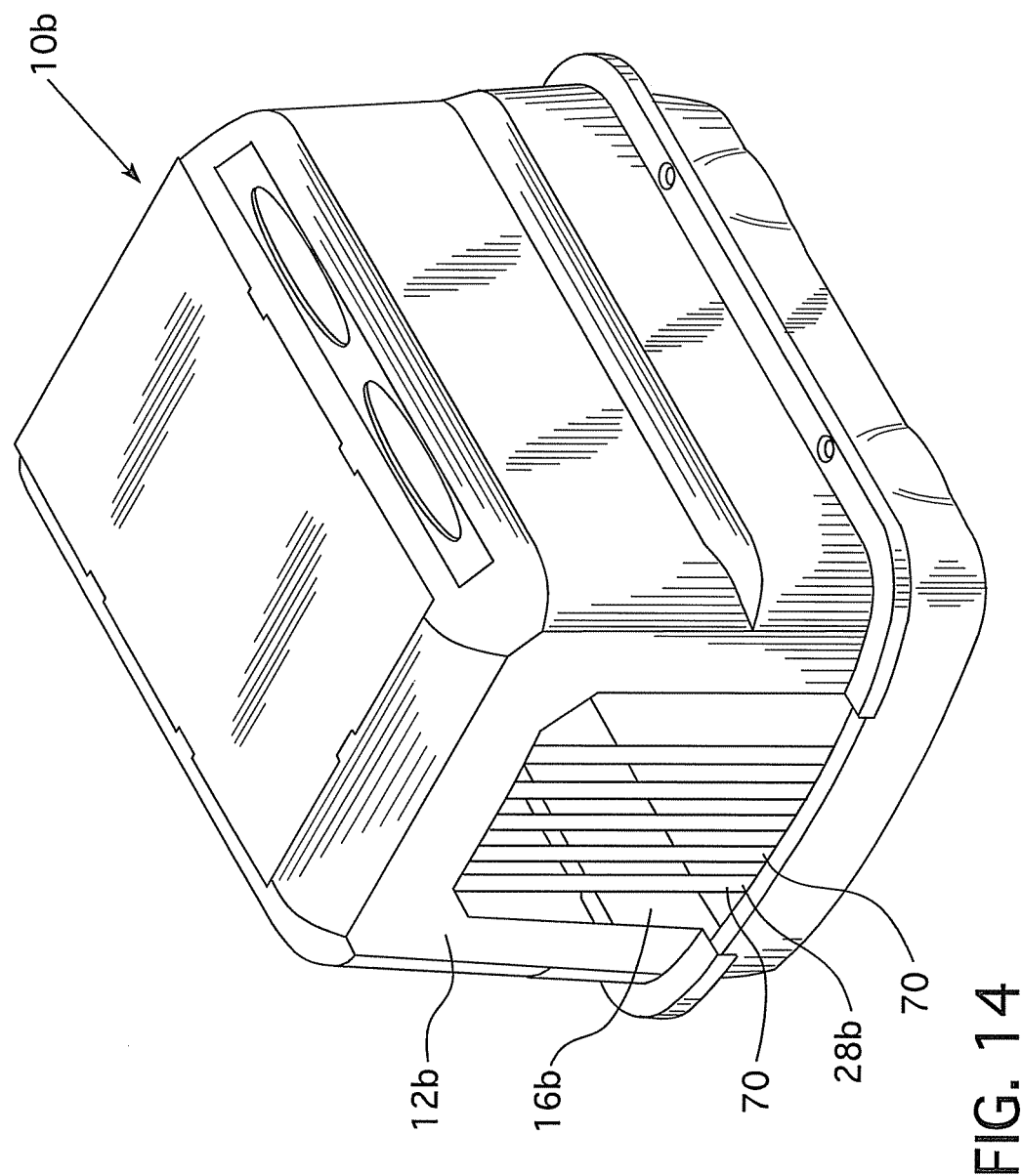
FIG. 14 is a perspective view of an alternative pet access limiting device in accordance with an embodiment of the present invention.
Figure 15:
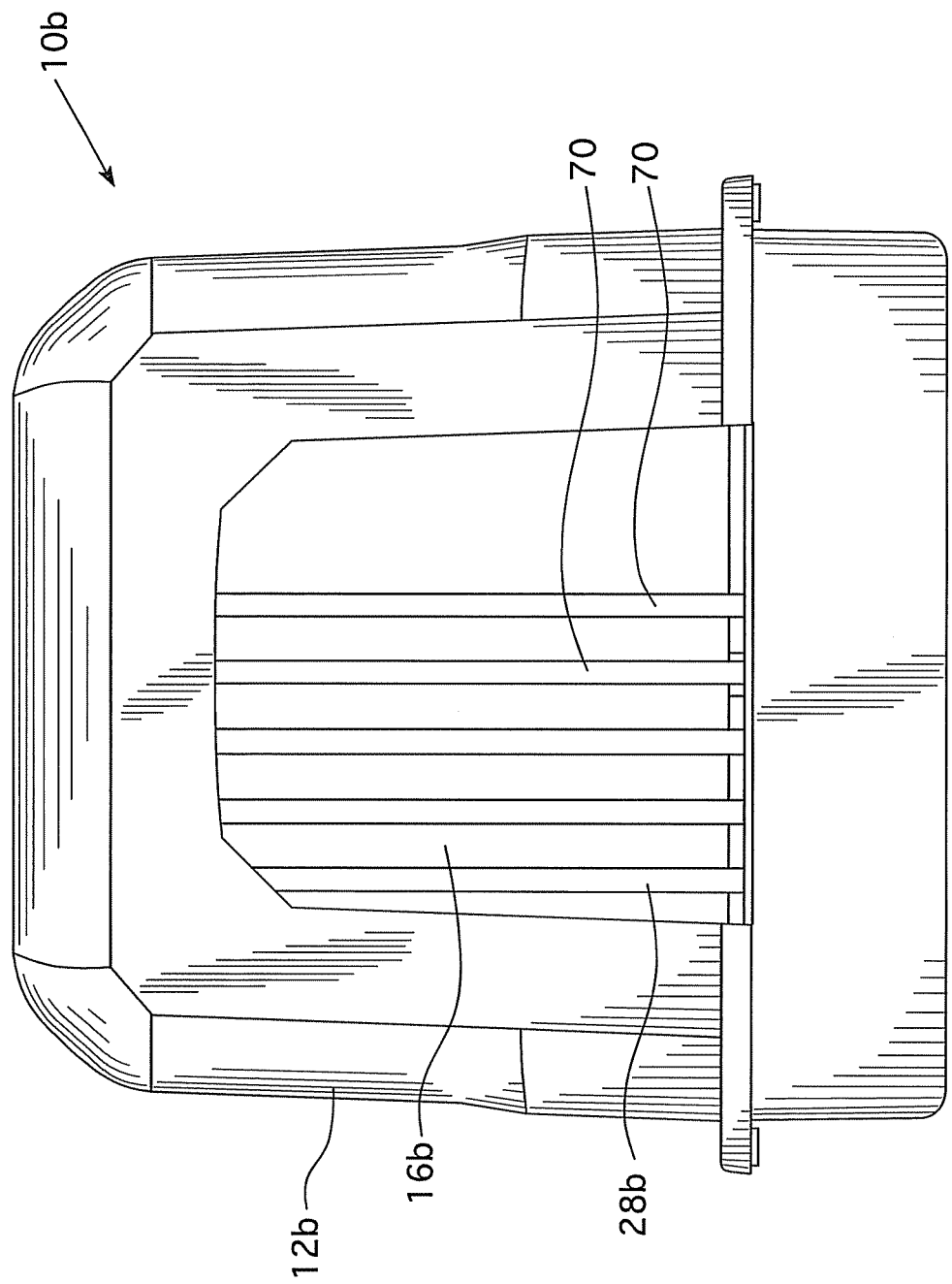
FIG. 15 is a front view of the pet access limiting device of FIG. 14.

In yet another embodiment, shown in FIGS. 14-15, the pet access limiting device 10b may include an opening-size selectable member 28b having a plurality of bars 70. In one embodiment, the bars 70 may be substantially vertically aligned to restrict at least a portion of the opening 16b of the housing 12b. In another embodiment, the bars 70 may be substantially horizontally aligned to restrict at least a portion of the opening 16b of the housing 12b. In yet another embodiment, the bars 70 may be substantially diagonally aligned to restrict at least a portion of the opening 16b of the housing 12b. The bars 70 may be provided in fixed arrangement within a portion of the housing 12, such that when a user desires to restrict the opening 16b, the user positions the desired number of bars 70 across the opening 16b. The bars 70 may be held within the housing 12b by any number of restraining mechanisms, such as spring compression or slideable engagement. The bars 70 may also have any desired spacing, such as from about 1 inch to about 4 inches between bars 70. In another embodiment, the bars 70 are fixedly held within the housing 12b and the user may determine the size of the opening 16b by sliding the bars 70 to the desired position within tracks disposed within the housing 12b. The bars 70 may then be locked into the desired position by the user.

Figure 16:
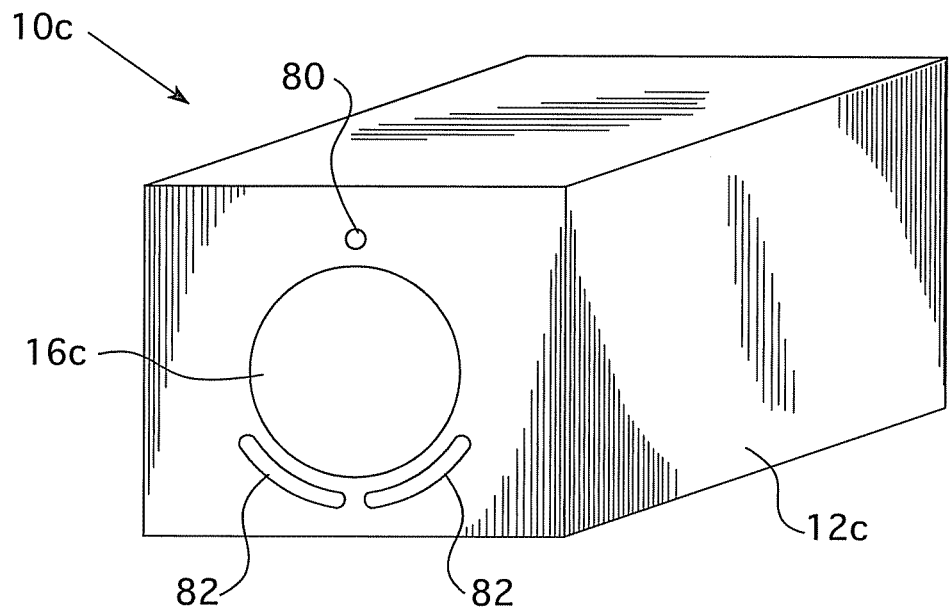
FIG. 16 is a perspective view of an alternative embodiment of a housing of a pet access limiting device in accordance with an embodiment of the present invention.
Figure 17:
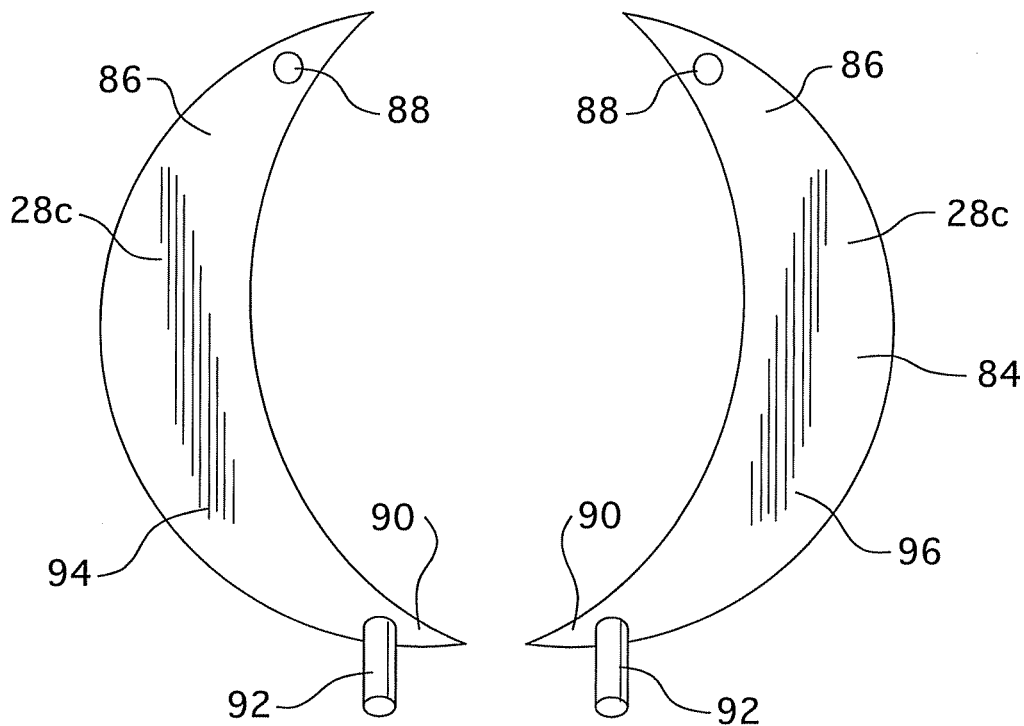
FIG. 17 is a front view of a pair of corresponding halves of an opening-size selectable member in accordance with an embodiment of the present invention.
Figure 18:
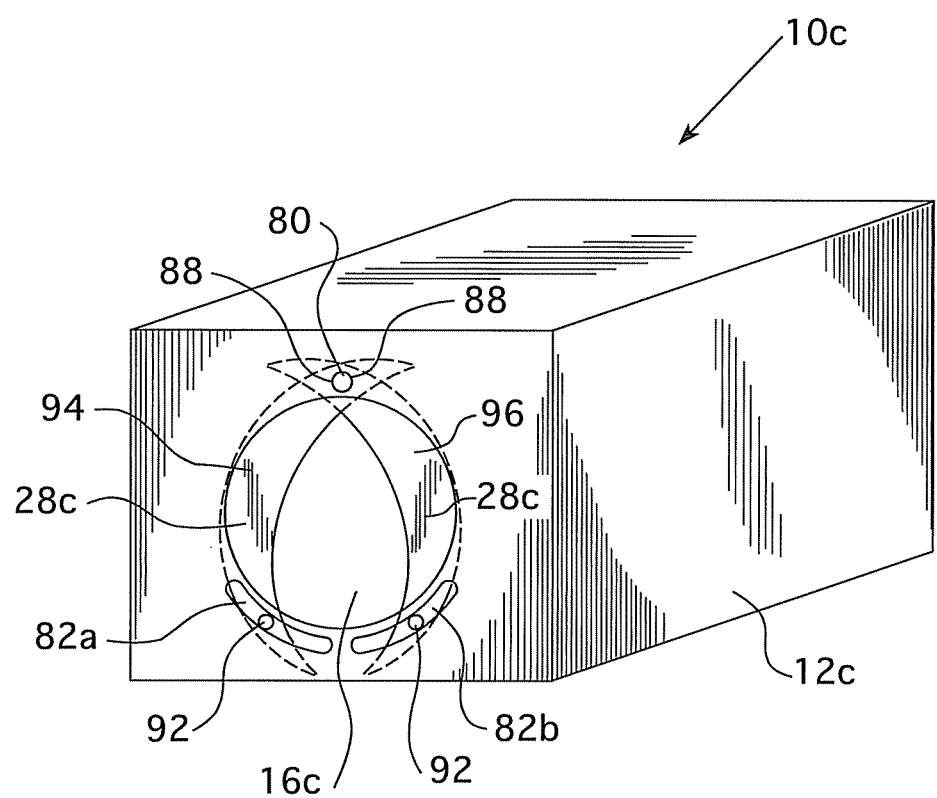
FIG. 18 is a perspective view of a pet access limiting device including the housing of FIG. 16 and the opening-size selectable member of FIG. 17 in accordance with an embodiment of the present invention.

In yet another embodiment, as shown in FIGS. 16-18, the pet access limiting device 10c may include a housing 12c and an opening-size selectable member 28c. The housing 12c includes an opening 16c defined therein, as previously described. In this configuration, the housing 12c further includes a pivot peg 80 adjacent the opening 16c, and at least one positioning slot 82 also adjacent the opening 16c. In one embodiment, the housing 12c defines a first positioning slot 82a adjacent the opening 16c on a first side of the housing 12c, and a second positioning slot 82b adjacent the opening 16c on a second side of the housing 12c. The opening-size selectable member 28c may include at least one crescent-shaped wedge 84, having a first end 86 and defining a hole 88 therethrough, which corresponds to the dimensions of the pivot peg 80. The crescent-shaped wedge 84 also includes a second end 90 having a positioning peg 92 extending outwardly therefrom and dimensioned to pass through at least a portion of the positioning slot 82 of the housing 12c. In one embodiment, the opening-size selectable member 28c includes two crescent-shaped wedges 84, the first wedge 94 having a generally leftward oriented concave shape, and the second wedge 96 having a generally rightward oriented concave shape.

As shown in FIG. 18, the opening-size selectable member 28c may be engageable with the housing 12c to restrict the opening 16c. During assembly, the first wedge 94 of the opening-size selectable member 28c may be positioned such that the pivot peg 80 of the housing 12c extends at least partially through the hole 88. The first wedge 94 is also positioned such that the positioning peg 92 extends at least partially through the positioning slot 82a of the housing 12c. The second wedge 96 may also be positioned such that the pivot peg 80 extends at least partially through the hole 88 and the positioning peg 92 extends at least partially through the positioning slot 82b of the housing 12c. In order to restrict the opening 16c of the housing 12c, the user may slide the positioning peg 92 of the wedge 94 of the opening-size selectable member 28c within the positioning slot 82a. The user may also slide the positioning peg 92 of the wedge 96 of the opening-size selectable member 28c within the positioning slot 82b. At least one of the first wedge 94 and the second wedge 96 may include locking means for securing the opening-size selectable member 28c in a fixed position with respect to the housing 12c, to restrict the size of the opening 16c.

Figure 19:
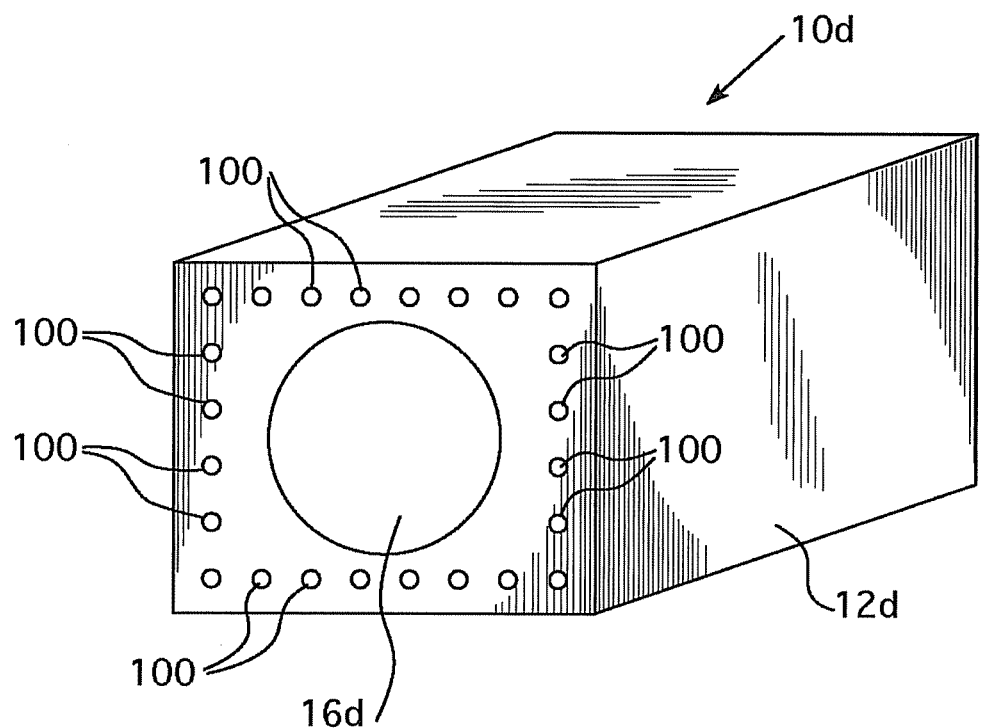
FIG. 19 is a perspective view of a housing of an alternative pet access limiting device in accordance with an embodiment of the present invention.

In yet another embodiment, as shown in FIGS. 19-25, the pet access limiting device 10d may include a housing 12d and an opening-size selectable member 28d. In this embodiment, the housing 12d defines an opening 16d, as previously described. As shown in FIG. 19, a plurality of ports or holes 100 may be disposed adjacent the opening 16d and extending at least partially into the housing 12d. The holes 100 may be disposed in any ordered pattern about the opening 16d, such as in a substantially square or rectangular orientation, or a substantially circular orientation.

Figures 20, 21:
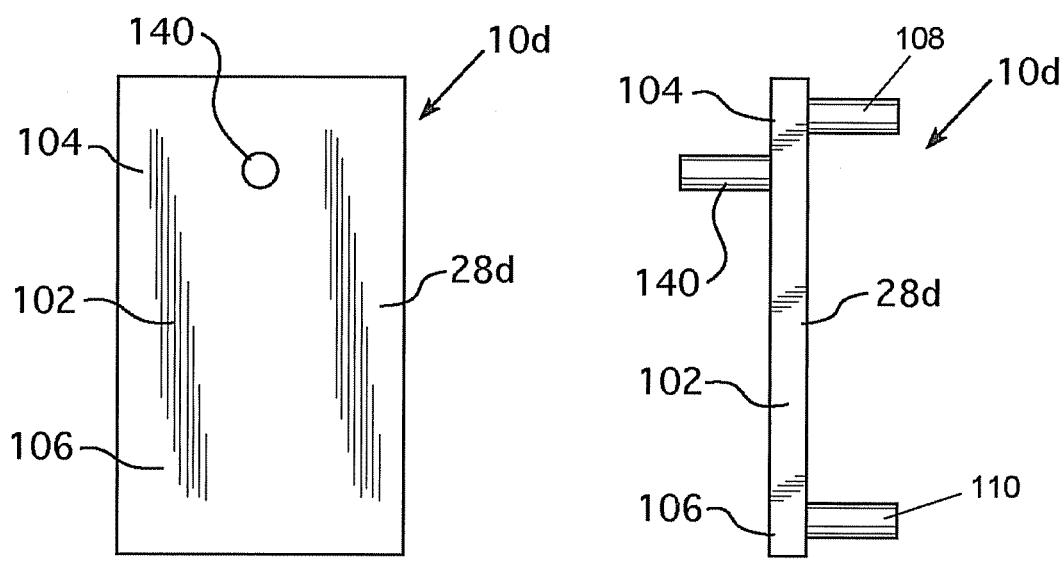
FIG. 20 is a front view of an alternative opening-size selectable member in accordance with an embodiment of the present invention.
FIG. 21 is a side view of the opening-size selectable member of FIG. 20.
Figure 22:
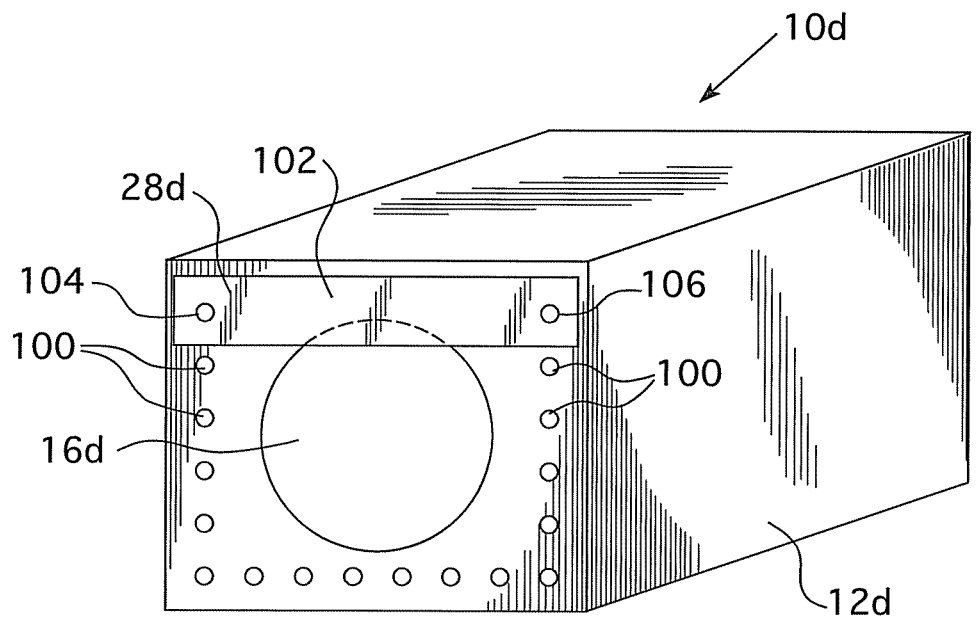
FIG. 22 is a perspective view of the housing of FIG. 19 having an opening-size selectable member of FIG. 20 engaged with the housing in a horizontal orientation.

As shown in FIGS. 20-21 the opening-size selectable member 28d may include a strip member 102 having a first end 104 and a second end 106. The strip member 102 may have a first peg 108 adjacent the first end 104 and a second peg 110 adjacent the second end 106, wherein the first peg 108 and the second peg 110 extend from substantially the same surface of the strip member 102. The first peg 108 and the second peg 100 are dimensioned for secure engagement within the holes 100 defined within the housing 12d. As shown in FIG. 22, the first peg 108 and the second peg 110 of the strip member 102 may be positioned within corresponding holes 100 of the housing 12d such that the strip member 102 may be disposed at least partially across the opening 16d. It is contemplated herein, that a plurality of strip members 102 may be similarly oriented to further restrict the size of the opening 16d of the housing 12d. As shown in FIG. 22, the strip member 102 is shown horizontally disposed at least partially across the opening 16d. It is also contemplated herein, that vertically disposed strip members may also be positioned across the opening 16d.

Figure 23:
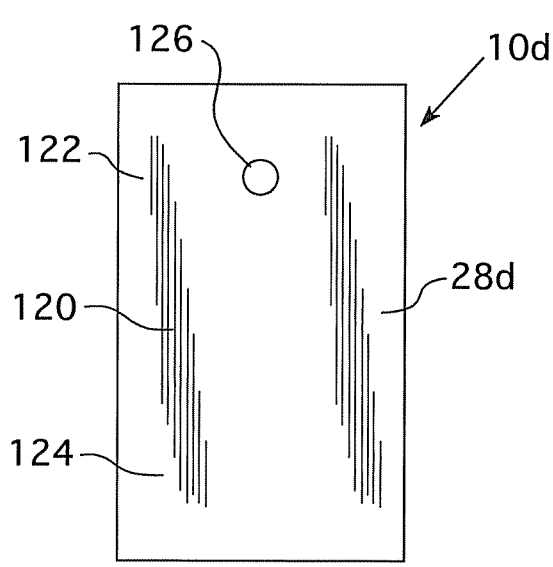
FIG. 23 is an alternative opening-size selectable member having a hole therethrough in accordance with an embodiment of the present invention.
Figure 24:
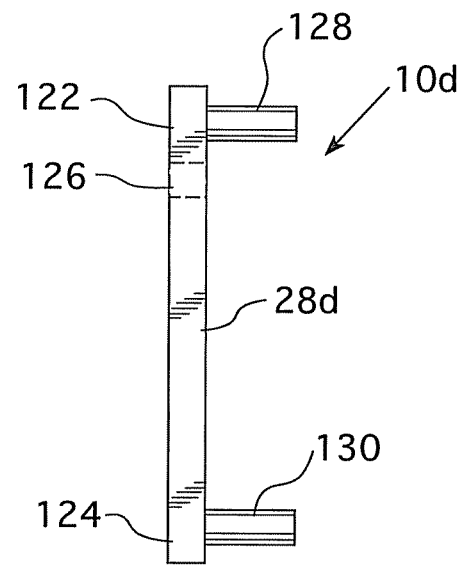
FIG. 24 is a side view of the alternative opening-size selectable member in accordance with an embodiment of the present invention.
Figure 25:
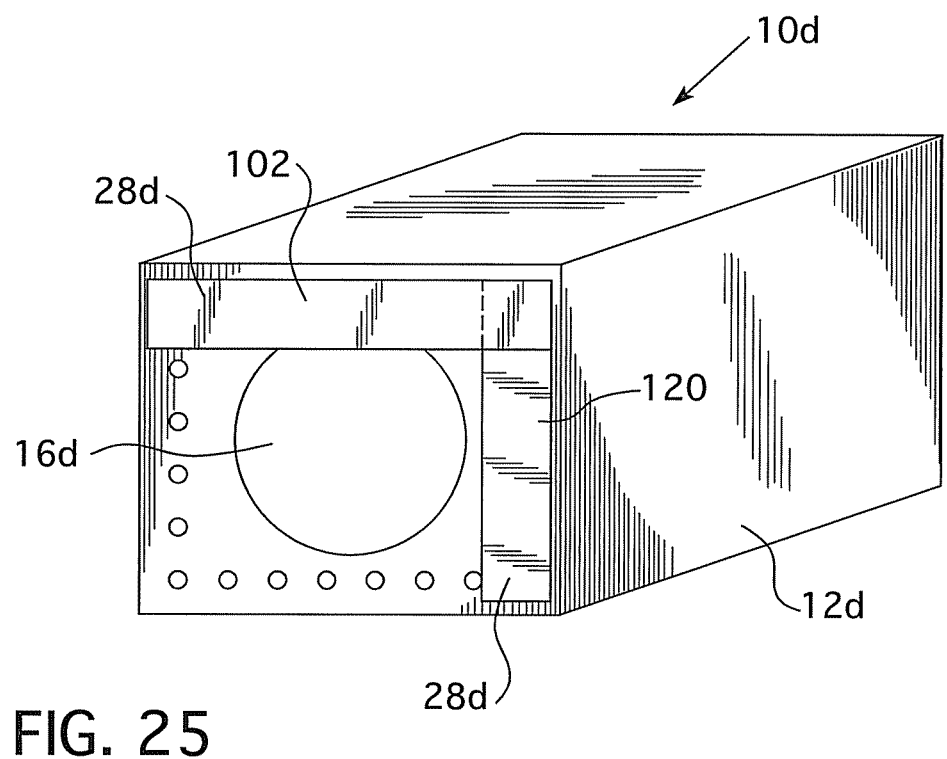
FIG. 25 is a perspective view of the housing of FIG. 19 having an opening-size selectable member of FIG. 20 engaged with the housing in a horizontal orientation and an opening-size selectable member of FIG. 23 engaged with the housing in a vertical orientation.

As shown in FIGS. 23-25, a second strip member 120 may have a first end 122 and a second end 124, with a hole 126 defined within the first end 122. A first peg 128 may also be provided adjacent the first end 122, and a second peg 130 may also be provided adjacent the second end 124. As shown in FIG. 25, a horizontally disposed strip member 102 and a vertically disposed strip member 120 may be at least partially disposed over the opening 16d to restrict the opening size. In this configuration, the vertically oriented strip member 120 may be disposed within corresponding holes 100 of the housing 12d. A horizontally oriented strip member 102, having a peg 140, as shown in FIG. 21, disposed within the hole 126 of the vertically oriented strip member 120 may also be provided over at least a portion of the opening 16d. In this manner, the opening size of the opening 16d may be further restricted. It is also contemplated herein that a plurality of horizontally oriented strip members and/or a plurality of vertically oriented strip members may be disposed over portions of the opening 16d to define an opening size to allow a pet of one size to pass therethrough, while preventing larger animals from entering the interior of the pet access restricting device.

While several embodiments for a pet access limiting device and method of use are described in the foregoing detailed description, those skilled in the art may make modifications and alterations to these embodiments without departing from the scope and spirit of the invention. Accordingly, the foregoing description is intended to be illustrative rather than restrictive. The invention described hereinabove is defined by the appended claims and all changes to the invention that fall within the meaning and the range of equivalency of the claims are embraced within their scope.

What is claimed is:

1. A device for limiting access of an animal, comprising:
   a housing having a sidewall defining an opening therein, and a housing interior in communication with the opening wherein the sidewall includes an angled exterior surface comprising a plurality of steps, wherein each step includes a riser, a base joined to the riser, and a lip joined to the base at an angle extending outwardly from the sidewall; and
   at least one opening-size selectable member comprising a protrusion engageable with the plurality of steps of the housing and adjustable to restrict at least one dimension of the opening to form a modified opening, wherein engagement of the protrusion with a first portion of the plurality of steps forms a first modified opening and engagement of the protrusion with a second portion of the plurality of steps forms a second modified opening, the second modified opening being different than the first modified opening, and the first portion being different than the second portion, and wherein each of the first and second modified openings allow passage of a first animal into the housing interior through the respective first or second modified opening and restrains a second animal from entering the housing interior, the second animal being larger than the first animal.

2. The device of claim 1, wherein the housing interior is adapted to house at least one of a food dish and a litter box therein.

3. The device of claim 1, wherein at least a portion of the opening-size selectable member is disposed over the opening.

4. The device of claim 1, wherein the opening-size selectable member may be fixed with respect to a portion of the housing to define a fixed modified opening.

5. The device of claim 1, wherein the housing further comprises a top portion defining an access port therethrough, the access port in communication with the housing interior.

6. A device for limiting access of an animal, comprising:
- a housing having a sidewall defining an opening therein, and a housing interior in communication with the opening wherein the sidewall includes an angled exterior surface comprising a plurality of steps, wherein each step includes a riser, a base joined to the riser, and a lip joined to the base at an angle extending outwardly from the sidewall; and
- at least one opening-size selectable member comprising a protrusion engageable with a first portion of the plurality of steps of the housing for restricting at least one dimension of the opening to form a first modified opening, the at least one opening-size selectable member engageable with a second portion of the plurality of steps of the housing for restricting at least one dimension of the opening to form a second modified opening, wherein the second modified opening is different from the first modified opening and the first portion of the plurality of steps is different from the second portion of the plurality of steps.

7. The device of claim 6, wherein the opening-size selectable member is engageable with at least a portion of the housing adjacent the opening.

* * * * *